(12) United States Patent
Chiang et al.

(10) Patent No.: US 10,063,089 B2
(45) Date of Patent: Aug. 28, 2018

(54) WIND POWER CHARGING CIRCUIT WITH THREE-PHASE, SINGLE-STAGE AND BRIDGELESS FRAMEWORK

(71) Applicant: National Chung-Shan Institute of Science & Technology, Taoyuan (TW)

(72) Inventors: Hsuang-Chang Chiang, Taipei (TW); Kun-Feng Chen, Taoyuan (TW); Chin-Yu Ho, Taoyuan (TW); Hsu-Pin Yang, New Taipei (TW)

(73) Assignee: National Chung-Shan Institute of Science & Technology, Taiwan (TW)

( * ) Notice: Subject to any disclaimer, the term of this patent is extended or adjusted under 35 U.S.C. 154(b) by 376 days.

(21) Appl. No.: 14/965,905

(22) Filed: Dec. 11, 2015

(65) Prior Publication Data
US 2017/0170681 A1    Jun. 15, 2017

(51) Int. Cl.
*H02J 7/14*    (2006.01)
*H02J 7/34*    (2006.01)

(52) U.S. Cl.
CPC .......... *H02J 7/1415* (2013.01); *H02J 7/1423* (2013.01); *H02J 7/34* (2013.01); *Y02E 10/766* (2013.01)

(58) Field of Classification Search
None
See application file for complete search history.

(56) References Cited

U.S. PATENT DOCUMENTS

| | | | | |
|---|---|---|---|---|
| 4,042,830 A | * | 8/1977 | Kellenbenz | G01R 31/02 307/40 |
| 5,083,039 A | * | 1/1992 | Richardson | F03D 7/0272 290/44 |
| 2009/0322083 A1 | * | 12/2009 | Wagoner | H02J 3/38 290/44 |
| 2011/0304215 A1 | * | 12/2011 | Avrutsky | H02M 1/42 307/82 |
| 2013/0194838 A1 | * | 8/2013 | Jang | H02M 1/4216 363/37 |
| 2015/0229227 A1 | * | 8/2015 | Aeloiza | H02M 5/04 323/355 |
| 2016/0315476 A1 | * | 10/2016 | Gomis | H02M 7/04 |

* cited by examiner

*Primary Examiner* — Robert Grant
*Assistant Examiner* — Tynese McDaniel

(57) ABSTRACT

The present invention provides a novel wind power charging circuit with three-phase, single-stage and bridgeless framework. This novel wind power charging circuit is developed based on an isolated single-ended primary-inductance converter (SEPIC) having buck-boost converting function, and can be applied in a wind turbine system for increasing the operation scope of the input voltage provided by a wind turbine of the wind turbine system, so as to facilitate the wind turbine system include wide-range operation scope under different wind speeds, such that the electric energy production and the electromechanical conversion efficiency of the wind turbine system are able to be effectively enhanced. In addition, because this novel wind power charging circuit does not include any bridgeless PFC circuits and bridge-type diode rectifiers, the low conducting loss as well as the whole circuit volume and assembly cost of the wind turbine system can be simultaneously reduced.

7 Claims, 6 Drawing Sheets

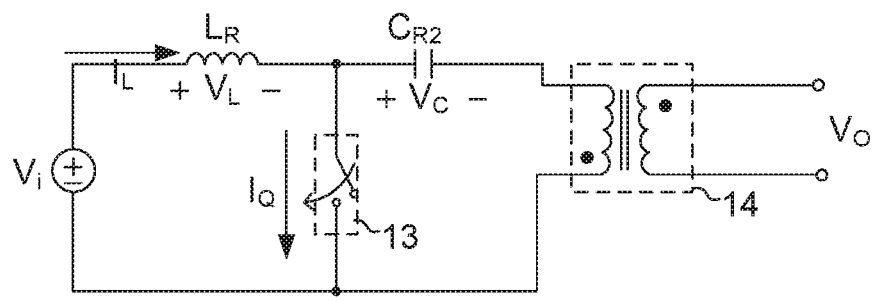
(a)
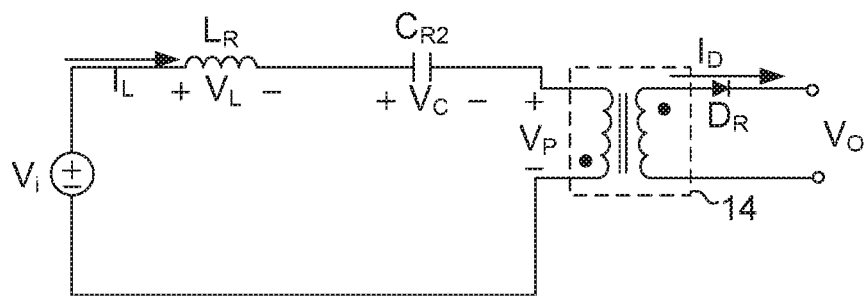
(b)
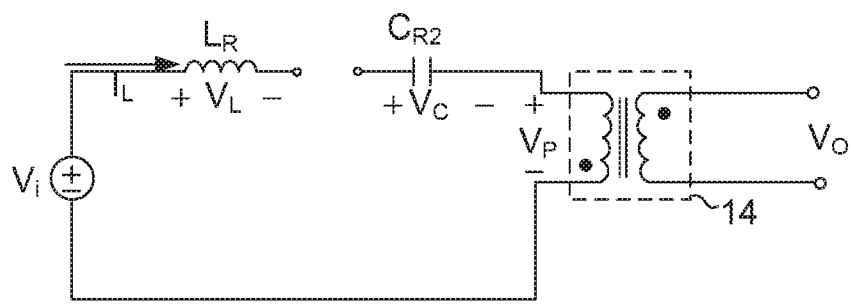
(c)
FIG. 3

WIND POWER CHARGING CIRCUIT WITH THREE-PHASE, SINGLE-STAGE AND BRIDGELESS FRAMEWORK

BACKGROUND OF THE INVENTION

1. Field of the Invention

The present invention relates to the technology field of power electronic circuits, and more particularly to a novel wind power charging circuit with three-phase, single-stage and bridgeless framework.

2. Description of the Prior Art

In order to facilitate environment be sustainable developed, government by country has made great efforts to develop the use of green energies, so as to carry out the diversification of energy use. In all of the green energies, solar power and wind power are the most developmental.

When a wind turbine system works for generating electricity, a plurality of blades of a wind turbine of the wind turbine system rotate to produce mechanical energy by the driving of wind power, and the produced mechanical energy subsequently drive a plurality of rotors of a generator of the wind turbine system. The electric power generated by the wind turbine system must be treated with a power conversion process by using a particularly-designed power converting device before being outputted to an electricity bank or a load.

Please refer to FIG. 1, which illustrates a framework view of a conventional wind turbine system. Because the input voltage and current of the power converting device 11' corresponding to the maximum power point of the wind turbine G' change with different wind speeds, the power converting device 11' must consists of a three-phase power factor correction (PFC) unit 111' and a power converting unit 112' in order to enhance the electromechanical conversion efficiency of the wind turbine system 1' shown by FIG. 1. In which, the three-phase PFC unit 111' is used for making the phase of three phase currents outputted by the wind turbine G' be equal to the phase of three phase voltages, so as to achieve a higher power factor. On the other hand, the power converting unit 112' is used to make the wind turbine G' be operated at the maximum power point under different wind speeds.

However, inventors of the present invention find that, because the three-phase PFC unit 111' includes EMI filter or diode rectifier, the conventional wind turbine system 1' shows the shortcoming of poor input efficiency under low voltage and high current operation. In addition, when the diode rectifier is replaced by a capacitor rectifier, the wind turbine system 1' reveals the drawbacks of distortion of input current and vibration of wind turbine. Although researchers propose that the input current distortion can be solved by replacing the three-phase PFC unit 111' with a bridgeless PFC unit, the wind turbine system 1' still includes the disadvantages of huge framework and high assembly cost because the wind turbine system 1' is constituted by two stage circuit units.

Accordingly, in view of the power converting device used in the conventional wind turbine system 1' includes many shortcomings and drawbacks, the inventor of the present application has made great efforts to make inventive research thereon and eventually provided a novel wind power charging circuit with three-phase, single-stage and bridgeless framework.

SUMMARY OF THE INVENTION

The primary objective of the present invention is to provide a novel wind power charging circuit with three-phase, single-stage and bridgeless framework. This novel wind power charging circuit is developed based on an isolated single-ended primary-inductance converter (SEPIC) having buck-boost converting function, and can be applied in a wind turbine system for increasing the operation scope of the input voltage provided by a wind turbine of the wind turbine system, so as to facilitate the wind turbine system include wide-range operation scope under different wind speeds, such that the electric energy production and the electromechanical conversion efficiency of the wind turbine system are able to be effectively enhanced. In addition, because this novel wind power charging circuit does not include any bridgeless PFC circuits and bridge-type diode rectifiers, the low conducting loss as well as the whole circuit volume and assembly cost of the wind turbine system can be simultaneously reduced.

Accordingly, in order to achieve the primary objective of the present invention, the inventor of the present invention provides a novel wind power charging circuit with three-phase, single-stage and bridgeless framework for being used for connecting to a wind turbine, so as to treat an electric power outputted by the wind turbine with a power converting process; this novel wind power charging circuit comprises:

a first electromagnetic interference (EMI) filtering unit, having a first filtering inductor and a first filtering capacitor, wherein the first filtering inductor is a first mutual inductor induced by an R-phase winding of three phase windings of the wind turbine;

a first energy storing unit, coupled to the first EMI unit for storing an R-phase current outputted by the wind turbine;

a first power switching unit, connected between the first EMI unit and the first energy storing unit, and used for executing constant-frequency ON/OFF switching operation according to the control of an external controlling unit, so as to make the first energy storing unit output a first primary side voltage;

a second electromagnetic interference (EMI) filtering unit, having a second filtering inductor and a second filtering capacitor, wherein the second filtering inductor is a second mutual inductor induced by a S-phase winding of the three phase windings of the wind turbine;

a second energy storing unit, coupled to the second EMI unit for storing a S-phase current outputted by the wind turbine;

a second power switching unit, connected between the second EMI unit and the second energy storing unit, and used for executing constant-frequency ON/OFF switching operation according to the control of the external controlling unit, so as to make the second energy storing unit output a second primary side voltage;

a third electromagnetic interference (EMI) filtering unit, having a third filtering inductor and a third filtering capacitor, wherein the third filtering inductor is a third mutual inductor induced by a T-phase winding of the three phase windings of the wind turbine;

a third energy storing unit, coupled to the third EMI unit for storing a T-phase current outputted by the wind turbine;

a third power switching unit, connected between the third EMI unit and the third energy storing unit, and used for executing constant-frequency ON/OFF switching operation according to the control of the external controlling unit, so as to make the third energy storing unit output a third primary side voltage;

a three-phase transformer, coupled to the first energy storing unit, the second energy storing unit and the third energy storing unit, and used for receiving the first primary side voltage, the second primary side voltage and the third primary side voltage and then outputting a first secondary side voltage, a second secondary side voltage and a third secondary side voltage; and an output rectifying unit, coupled to the three-phase transformer, and used for receiving the first secondary side voltage, the second secondary side voltage and the third secondary side voltage, and then output an output voltage to a load after completing a rectifying and filtering process.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein:

FIG. 3 shows a single-phase equivalent circuit diagram;

DETAILED DESCRIPTION OF THE PREFERRED EMBODIMENTS

To more clearly describe a novel wind power charging circuit with three-phase, single-stage and bridgeless framework according to the present invention, embodiments of the present invention will be described in detail with reference to the attached drawings hereinafter.

Figure 1:
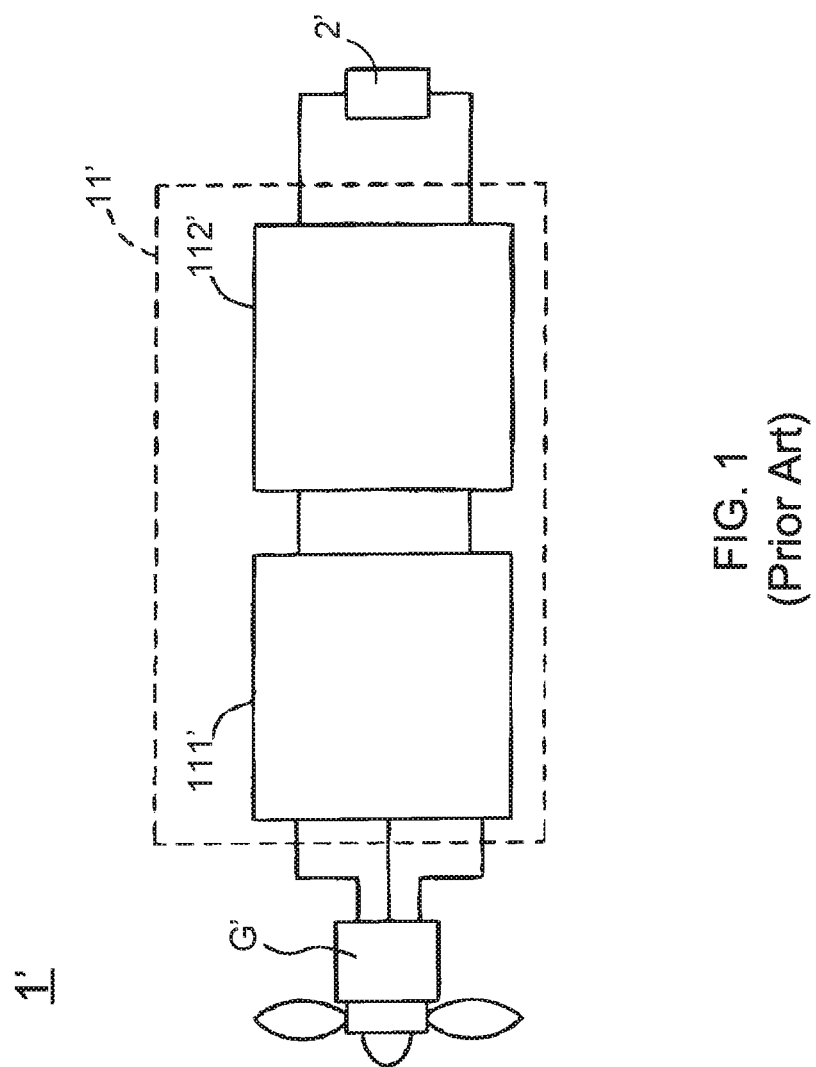
FIG. 1 shows a framework view of a conventional wind turbine system.
Figure 2:
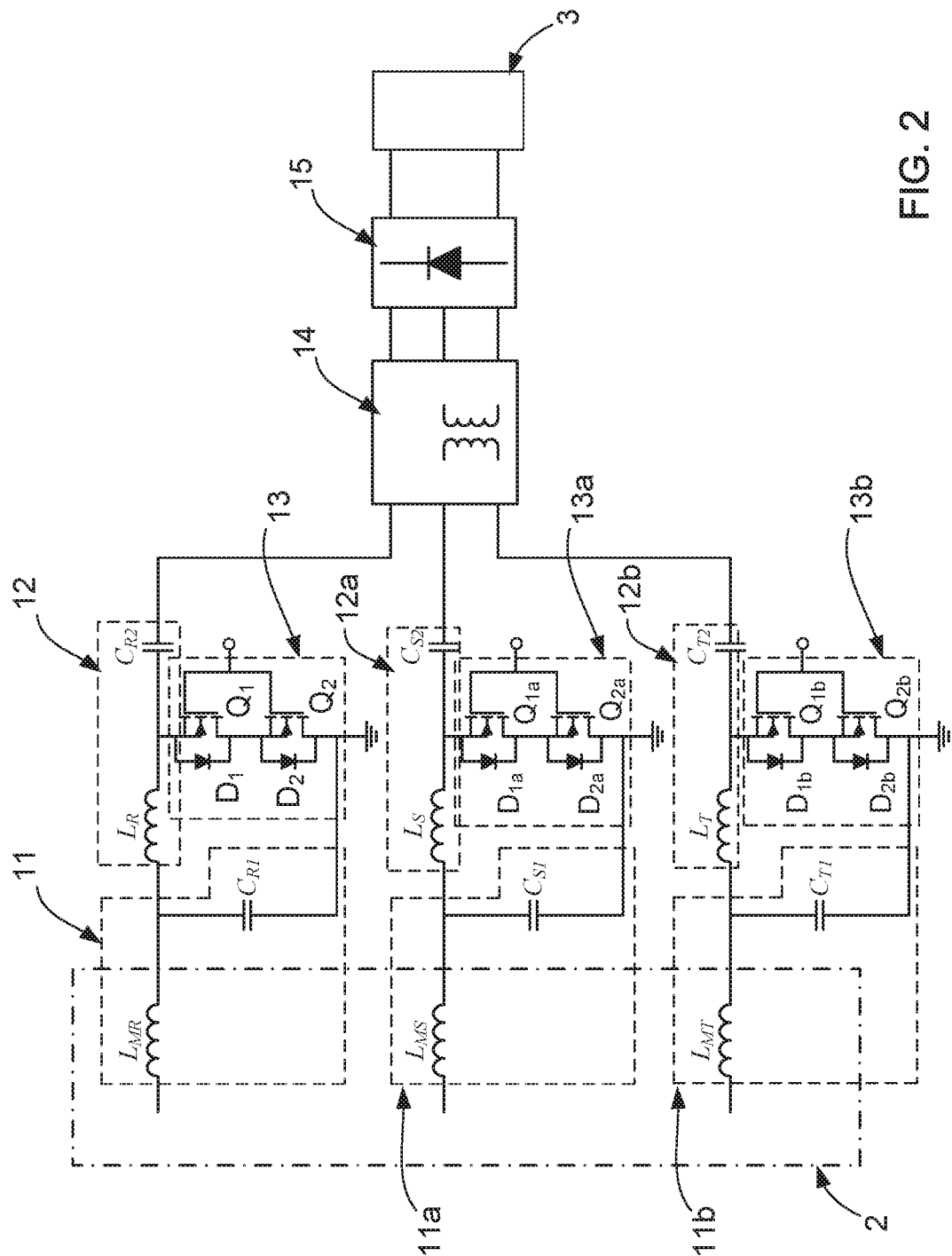
FIG. 2 shows a circuit framework view of a novel wind power charging circuit with three-phase, single-stage and bridgeless framework according to the present invention.

Please referring to FIG. 2, which illustrates a circuit framework view of a novel wind power charging circuit with three-phase, single-stage and bridgeless framework according to the present invention. As shown in FIG. 2, the novel wind power charging circuit proposed by the present invention is used for connecting to a wind turbine 2 so as to treat an electric power outputted by the wind turbine 2 with a power converting process. The novel wind power charging circuit consists of: a first electromagnetic interference (EMI) filtering unit 11, a first energy storing unit 12, a first power switching unit 13, a second electromagnetic interference (EMI) filtering unit 11*a*, a second energy storing unit 12*a*, a second power switching unit 13*a*, a third electromagnetic interference (EMI) filtering unit 11*b*, a third energy storing unit 12*b*, a third power switching unit 13*b*, a three-phase transformer 14, and an output rectifying unit 15. In the present invention, the said load 3 is an electricity bank, and the said three-phase transformer 14 is a Y-Δ transformer.

The first EMI filtering unit 11 has a first filtering inductor $L_{MR}$ and a first filtering capacitor $C_{R1}$, wherein the first filtering inductor $L_{MR}$ is a first mutual inductor induced by an R-phase winding of three phase windings of the wind turbine 2. Moreover, the first energy storing unit 12 is coupled to the first EMI unit 11 for storing an R-phase current outputted by the wind turbine 2. As FIG. 2 shows, the first energy storing unit 12 consists of a first energy storing inductor $L_R$ and a first energy storing capacitor $C_{R2}$, wherein one end of the first energy storing inductor $L_R$ is connected to the first filtering inductor $L_{MR}$ and the first filtering capacitor $C_{R1}$, and another end of the first energy storing inductor $L_R$ is coupled to the first power switching unit 13. On the other hand, one end of the first energy storing capacitor $C_{R2}$ is coupled to the first power switching unit 13 connected to the another end of the first energy storing inductor $L_R$, and another end of the first energy storing capacitor $C_{R2}$ is coupled to the three-phase transformer 14.

Corresponding to the first EMI filtering unit 11 and the first energy storing unit 12, the first power switching unit 13 is connected between the first EMI unit 11 and the first energy storing unit 12, and used for executing constant-frequency ON/OFF switching operation according to the control of an external controlling unit, so as to make the first energy storing unit 12 output a first primary side voltage. The first power switching unit 13 consists of: a first power transistor $Q_1$ and a second power transistor $Q_2$, wherein the source terminal of the first power transistor $Q_1$ is connected between the first energy storing inductor $L_R$ and the first energy storing capacitor $C_{R2}$, and a first diode $D_1$ is connected to the source terminal and the drain terminal of the first power transistor $Q_1$ by the positive terminal and negative terminal thereof. On the other hand, the source terminal and the drain terminal of the second power transistor $Q_2$ are respectively connected to the drain terminal of the first power transistor $Q_1$ and a ground of the novel wind power charging circuit. Moreover, a second diode $D_2$ is connected to the source terminal and the drain terminal of the second power transistor $Q_2$ by the positive terminal and negative terminal thereof.

referring to FIG. 2 again, the second EMI filtering unit 11*a* has a second filtering inductor $L_{MS}$ and a second filtering capacitor $C_{S1}$, wherein the second filtering inductor $L_{MS}$ is a second mutual inductor induced by a S-phase winding of the three phase windings of the wind turbine 2. Moreover, the second energy storing unit 12*a* is coupled to the second EMI unit 11*a* for storing a S-phase current outputted by the wind turbine 2. As FIG. 2 shows, the second energy storing unit 12*a* consists of: a second energy storing inductor $L_S$ and a second energy storing capacitor $C_{S2}$, wherein one end of the second energy storing inductor $L_S$ is connected to the second filtering inductor $L_{MS}$ and the second filtering capacitor $C_{S1}$, and another end of the second energy storing inductor $L_S$ is coupled to the second power switching unit 13*a*.

Corresponding to the second EMI filtering unit 11*a* and the second energy storing unit 12*a*, the second power switching unit 13*a* is connected between the second EMI unit 11*a* and the second energy storing unit 12*a*, and used for executing constant-frequency ON/OFF switching operation according to the control of the external controlling unit, so as to make the second energy storing unit 12*a* output a second primary side voltage. The second power switching unit 13*a* consists of: a third power transistor $Q_{1a}$ and a fourth power transistor $Q_{2a}$, wherein the source terminal of the third power transistor $Q_{1a}$ is connected between the second energy storing inductor $L_S$ and the second energy storing capacitor $C_{S2}$, and a third diode $D_{1a}$ is connected to the source terminal and the drain terminal of the third power transistor $Q_{1a}$ by the positive terminal and negative terminal thereof. On the other hand, the source terminal and the drain terminal of the fourth power transistor $Q_{2a}$ are respectively connected to the drain terminal of the third power transistor $Q_{1a}$ and the ground of the novel wind power charging circuit. Moreover, a fourth diode $D_{2a}$ is connected to the source terminal and the drain terminal of the fourth power transistor $Q_{2a}$ by the positive terminal and negative terminal thereof.

referring to FIG. 2 again, the third EMI filtering unit 11b has a third filtering inductor $L_{MT}$ and a third filtering capacitor $C_{T1}$, wherein the third filtering inductor $L_{MT}$ is a third mutual inductor induced by a T-phase winding of the three phase windings of the wind turbine 2. Moreover, the third energy storing unit 12b is coupled to the third EMI unit 11b for storing a T-phase current outputted by the wind turbine 2. As FIG. 2 shows, the third energy storing unit 12b consists of: a third energy storing inductor $L_T$ and a third energy storing capacitor $C_{T2}$, wherein one end of the third energy storing inductor $L_T$ is connected to the third filtering inductor $L_{MT}$ and the third filtering capacitor $C_{T1}$, and another end of the third energy storing inductor $L_T$ is coupled to the third power switching unit 13b.

Corresponding to the third EMI filtering unit 11b and the third energy storing unit 12b, the third power switching unit 13b consists of: a fifth power transistor $Q_{1b}$ and a sixth power transistor $Q_{2b}$, wherein the source terminal of the fifth power transistor $Q_{1b}$ is connected between the third energy storing inductor $L_T$ and the third energy storing capacitor $C_{T2}$, and a fifth diode $D_{1b}$ is connected to the source terminal and the drain terminal of the fifth power transistor $Q_{1b}$ by the positive terminal and negative terminal thereof. On the other hand, the source terminal and the drain terminal of the sixth power transistor $Q_{2b}$ are respectively connected to the drain terminal of the fifth power transistor $Q_{1b}$ and the ground of the novel wind power charging circuit. Moreover, a sixth diode $D_{2b}$ is connected to the source terminal and the drain terminal of the sixth power transistor $Q_{2b}$ by the positive terminal and negative terminal thereof.

Figure 4:
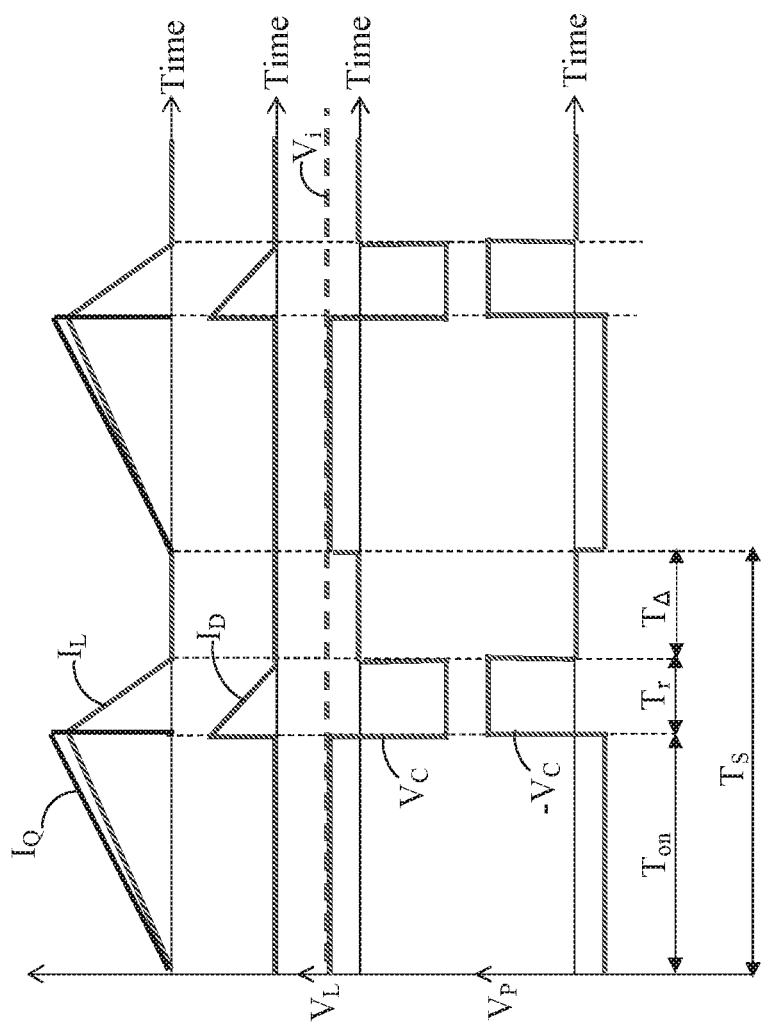
FIG. 4 shows a transient waveform diagram of the single-phase equivalent circuit.

Thus, above descriptions have clearly and completely introduce all constituting elements of the novel wind power charging circuit with three-phase, single-stage and bridgeless framework. Next, the theoretical basis for the novel wind power charging circuit will be introduced in follows. Please refer to FIG. 3 and FIG. 4, where a single-phase equivalent circuit diagram and a transient waveform diagram of the single-phase equivalent circuit are provided. When the novel wind power charging circuit is operated within a time interval ($T_{on}$) of switching turn-on, the input voltage $V_i$ charges the first energy storing inductor $L_R$ so as to make the inductor current $I_L$ of the first energy storing inductor $L_R$ be enhanced; moreover, the first energy storing capacitor $C_{R2}$ is simultaneously charged to has a capacitor voltage $V_C$. At the meantime, the inductor voltage $V_L$ of the can be calculated by following equations: $V_L=V_i-V_C-NV_O$, wherein $V_i$ is presented by $V_{m,max}$ Sin($\omega$t), N means the turns ratio of the three-phase transformer 14, and $V_O$ is the output voltage of the novel wind power charging circuit.

Continuously, when the novel wind power charging circuit is operated within a time interval ($T_r$) of diode turn-on, the first energy storing capacitor $C_{R2}$ discharges toward the three-phase transformer 14, such that a diode current $I_D$ can be measured on the rectifying diode $D_R$ of the output rectifying unit 15. After the Tr, the novel wind power charging circuit is eventually operated within a time interval ($T_A$) of inductor current being discontinuous. Therefore, based on FIG. 3 and FIG. 4, the engineers skilled in power electronic art can easily find following two mathematical equations by derivation: mathematical equation 1:

$$I_{L,peak} = \frac{V_{m,max} D_{max} T_S}{L_R};$$

and mathematical equation 2:

$$P_{O,max} = 3 \frac{V_{m,max}}{\sqrt{2}} \frac{I_{L,peak}}{2\sqrt{2}}.$$

Obviously, as long as the switching time ($T_S$) of the power switching unit as well as the maximum duty cycle ($D_{max}$) and the maximum output power ($P_{O,max}$) of the wind turbine system are decided, a suitable first energy storing indicator $L_R$ can be found through the two mathematical equations when practically applying the novel wind power charging circuit of the present invention into any one wind turbine system. Off course, the two mathematical equations can also be used for finding the suitable second energy storing indicator $L_R$ and third energy storing indicator $L_T$. Moreover, after finding the three energy storing indicators, it is able to further find a proper turns ratio for the three-phase transformer 14 and corresponding maximum breakdown voltage for the power transistors by using following mathematical equation 3: $V_{Q,max}=V_{m,max}+NV_O$.

Figure 5:
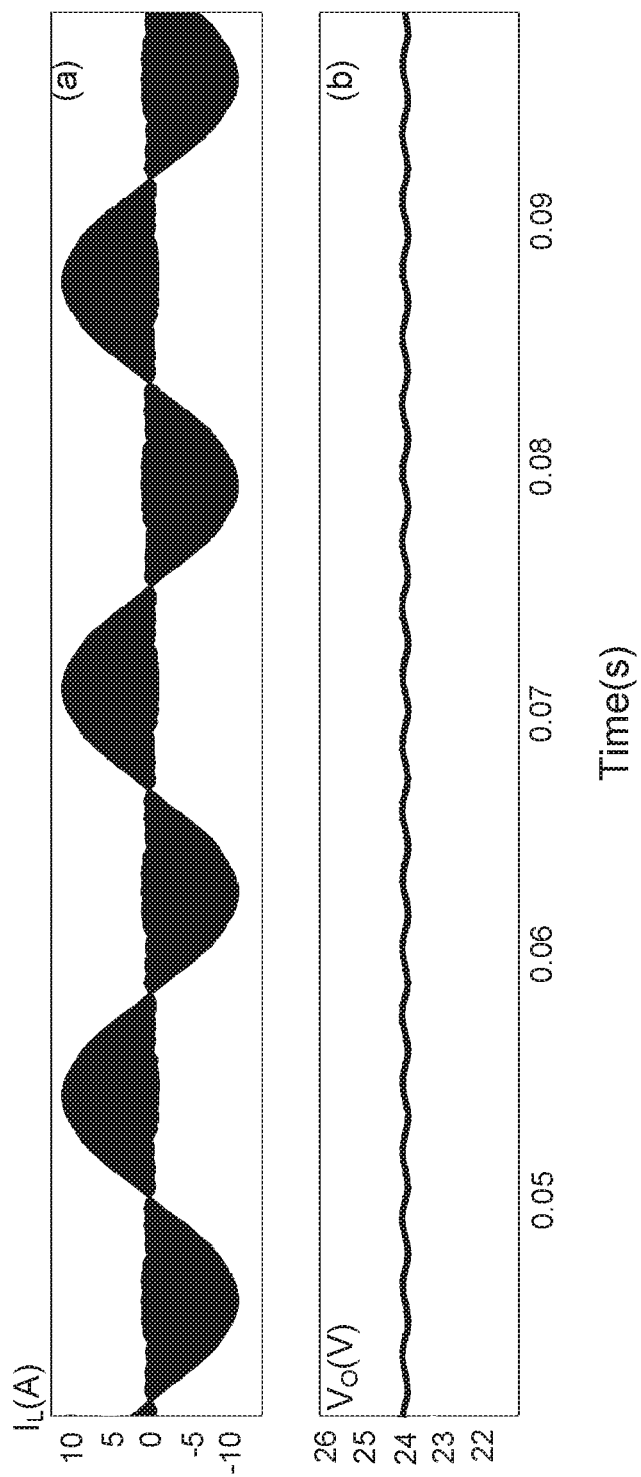
FIG. 5 provides waveform diagrams for shows circuit simulation results of the novel wind power charging circuit.

After introducing the theoretical basis of the novel wind power charging circuit of the present invention, the practicability of the novel wind power charging circuit is next be verified through simulation software. Please refer to FIG. 5, where waveform diagrams are provided for showing circuit simulation results of the novel wind power charging circuit. From FIG. 5, it can find that the output voltage $V_O$ of the novel wind power charging circuit be steadily maintain at 24V when an AC input with $V_{m,max}$=112V is inputted into the novel wind power charging circuit.

Figure 6:
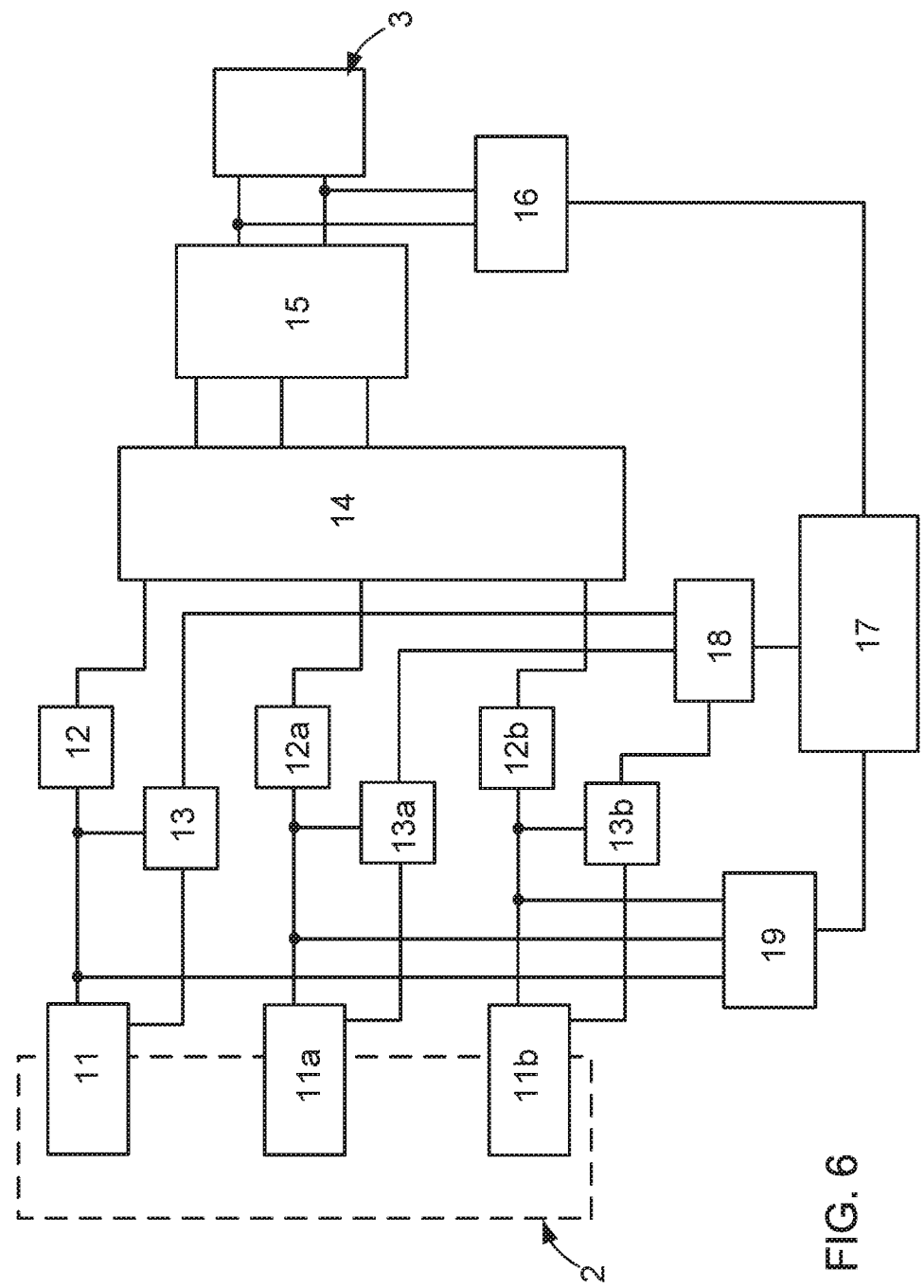
FIG. 6 shows a second circuit framework view of a novel wind power charging circuit with three-phase, single-stage and bridgeless framework according to the present invention.

Please continuously refer to FIG. 6, where a second circuit framework view of a novel wind power charging circuit with three-phase, single-stage and bridgeless framework according to the present invention is provided. As FIG. 2 and FIG. 6 show, in order to make this novel wind power charging circuit able to automatically provide a steady output voltage $V_O$ according different storage battery assembly (i.e., the load 3), an input-end signal sampling unit 19, an output-end signal sampling unit 16, a processing and controlling unit 17, and a PWM controlling unit 18 are needed to be added into the circuit shown in FIG. 2. Therefore, a second circuit framework of the novel wind power charging circuit is established as FIG. 6.

In FIG. 6, the input-end signal sampling unit 19 is connected between the first EMI filtering unit 11 and the first energy storing unit 12, the second EMI filtering unit 11a and the second energy storing unit 12a as well as the third EMI filtering unit 11b and the third energy storing unit 12b, and used for sampling the three phase currents and/or the three phase voltages outputted by the wind turbine 2, so as to output a first sample signal. On the other hand, the output-end signal sampling unit 16 is connected between the output rectifying unit 15 and the load 3, used for treat the output voltage VO with a signal sampling process, so as to output a second sample signal.

Inhering to above descriptions, the processing and controlling unit 17 is coupled to the input-end signal sampling unit 19 and the output-end signal sampling unit 16 for receiving the first sample signal and the second sample signal, and then outputting an error modulation signal after completing a process and calculation operation according to the first sample signal and the second sample signal. Moreover, the PWM controlling unit 18 is coupled to the processing and controlling unit 17 for receiving the error modulation signal, so as to output PWM signals to the first power switching unit 13, the second power switching unit 13a and the third power switching unit 13b according to the error modulation signal.

Therefore, through above descriptions, the novel wind power charging circuit with three-phase, single-stage and bridgeless framework provided by the present invention has been introduced completely and clearly; in summary, the present invention includes the advantages of:

(1) This novel wind power charging circuit is developed based on an isolated single-ended primary-inductance converter (SEPIC) having buck-boost converting function, and can be applied in a wind turbine system for increasing the operation scope of the input voltage provided by a wind turbine of the wind turbine system, so as to facilitate the wind turbine system include wide-range operation scope under different wind speeds, such that the electric energy production and the electromechanical conversion efficiency of the wind turbine system are able to be effectively enhanced.

In addition, because this novel wind power charging circuit does not include any bridgeless PFC circuits and bridge-type diode rectifiers, the low conducting loss as well as the whole circuit volume and assembly cost of the wind turbine system can be simultaneously reduced.

Moreover, because the three-phase transformer 14 used in the novel wind power charging circuit of the present invention is a Y-Δ transformer, the whole volume and assembly cost for the three-phase transformer 14 can be largely reduced.

The above description is made on embodiments of the present invention. However, the embodiments are not intended to limit scope of the present invention, and all equivalent implementations or alterations within the spirit of the present invention still fall within the scope of the present invention.

What is claimed is:

1. A wind power charging circuit with three-phase, single-stage and bridgeless framework, being used for connecting to a wind turbine so as to treat an electric power outputted by the wind turbine with a power converting process; the wind power charging circuit comprises:
   a first electromagnetic interference (EMI) filtering unit, having a first filtering inductor and a first filtering capacitor, wherein the first filtering inductor is a first mutual inductor induced by a R-phase winding of three phase windings of the wind turbine;
   a first energy storing unit, being coupled to the first EMI filtering unit for storing an R-phase current outputted by the wind turbine;
   a first power switching unit, being connected between the first EMI filtering unit and the first energy storing unit, used for executing constant-frequency ON/OFF switching operation so as to make the first energy storing unit output a first primary side voltage;
   a second electromagnetic interference (EMI) filtering unit, having a second filtering inductor and a second filtering capacitor, wherein the second filtering inductor is a second mutual inductor induced by a S-phase winding of the three phase windings of the wind turbine;
   a second energy storing unit, being coupled to the second EMI filtering unit for storing a S-phase current outputted by the wind turbine;
   a second power switching unit, being connected between the second EMI filtering unit and the second energy storing unit, used for executing constant-frequency ON/OFF switching operation so as to make the second energy storing unit output a second primary side voltage;
   a third electromagnetic interference (EMI) filtering unit, having a third filtering inductor and a third filtering capacitor, wherein the third filtering inductor is a third mutual inductor induced by a T-phase winding of the three phase windings of the wind turbine;
   a third energy storing unit, being coupled to the third EMI filtering unit for storing a T-phase current outputted by the wind turbine;
   a third power switching unit, being connected between the third EMI filtering unit and the third energy storing unit, used for executing constant-frequency ON/OFF switching operation so as to make the third energy storing unit output a third primary side voltage;
   a three-phase transformer, being coupled to the first energy storing unit, the second energy storing unit and the third energy storing unit, used for receiving the first primary side voltage, the second primary side voltage and the third primary side voltage and then outputting a first secondary side voltage, a second secondary side voltage and a third secondary side voltage; and
   an output rectifying unit, being coupled to the three-phase transformer, used for receiving the first secondary side voltage, the second secondary side voltage and the third secondary side voltage, and then output an output voltage to a load after completing a rectifying and filtering process;
   Wherein the first energy storing unit comprises:
      a first energy storing inductor, wherein one end of the first energy storing inductor is connected to the first filtering inductor and the first filtering capacitor, and another end of the first energy storing inductor being coupled to the first power switching unit; and
      a first energy storing capacitor, wherein one end of the first energy storing capacitor is coupled to the first power switching unit connected to the another end of the first energy storing inductor, and another end of the first energy storing capacitor being coupled to the three-phase transformer;
   Wherein the second energy storing unit comprises:
      a second energy storing inductor, wherein one end of the second energy storing inductor is connected to the second filtering inductor and the second filtering capacitor, and another end of the second energy storing inductor being coupled to the second power switching unit; and
      a second energy storing capacitor, wherein one end of the second energy storing capacitor is coupled to the second power switching unit connected to the another end of the second energy storing inductor, and another end of the second energy storing capacitor being coupled to the three-phase transformer;
   Wherein the third energy storing unit comprises:
      a third energy storing inductor, wherein one end of the third energy storing inductor is connected to the third filtering inductor and the third filtering capacitor, and another end of the third energy storing inductor being coupled to the third power switching unit; and
      a third energy storing capacitor, wherein one end of the third energy storing capacitor is coupled to the third power switching unit connected to the another end of the third energy storing inductor, and another end of the third energy storing capacitor being coupled to the three-phase transformer.

2. The wind power charging circuit of claim 1, wherein the load is an electricity bank.

3. The wind power charging circuit of claim 1, wherein the three-phase transformer is a Y-Δ transformer.

4. The wind power charging circuit of claim 1, further comprising:
- an input-end signal sampling unit, being connected between the first EMI filtering unit and the first energy storing unit, the second EMI filtering unit and the second energy storing unit as well as the third EMI filtering unit and the third energy storing unit, used for sampling the three phase currents and/or the three phase voltages outputted by the wind turbine, so as to output a first sample signal;
- an output-end signal sampling unit, being connected between the output rectifying unit and the load, used to treat the output voltage with a signal sampling process, so as to output a second sample signal;
- a processing and controlling unit, being coupled to the input-end signal sampling unit and the output-end signal sampling unit for receiving the first sample signal and the second sample signal, and then outputting an error modulation signal after completing a process and calculation operation according to the first sample signal and the second sample signal; and
- a PWM controlling unit, being coupled to the processing and controlling unit for receiving the error modulation signal, so as to output PWM signals to the first power switching unit, the second power switching unit and the third power switching unit according to the error modulation signal.

5. The wind power charging circuit of claim 1, wherein the first power switching unit comprises:
- a first power transistor, wherein the source terminal of the first power transistor is connected between the first energy storing inductor and the first energy storing capacitor, and a first diode being connected to the source terminal and the drain terminal of the first power transistor by the positive terminal and negative terminal thereof; and
- a second power transistor, wherein the source terminal and the drain terminal of the second power transistor are respectively connected to the drain terminal of the first power transistor and a ground of the wind power charging circuit; moreover, a second diode being connected to the source terminal and the drain terminal of the second power transistor by the positive terminal and negative terminal thereof.

6. The wind power charging circuit of claim 1, wherein the second power switching unit comprises:
- a third power transistor, wherein the source terminal of the third power transistor is connected between the second energy storing inductor and the second energy storing capacitor, and a third diode being connected to the source terminal and the drain terminal of the third power transistor by the positive terminal and negative terminal thereof; and
- a fourth power transistor, wherein the source terminal and the drain terminal of the fourth power transistor are respectively connected to the drain terminal of the third power transistor and the ground of the wind power charging circuit; moreover, a fourth diode being connected to the source terminal and the drain terminal of the fourth power transistor by the positive terminal and negative terminal thereof.

7. The wind power charging circuit of claim 1, wherein the third power switching unit comprises:
- a fifth power transistor, wherein the source terminal of the fifth power transistor is connected between the third energy storing inductor and the third energy storing capacitor, and a fifth diode being connected to the source terminal and the drain terminal of the fifth power transistor by the positive terminal and negative terminal thereof; and
- a sixth power transistor, wherein the source terminal and the drain terminal of the sixth power transistor are respectively connected to the drain terminal of the fifth power transistor and the ground of the wind power charging circuit; moreover, a sixth diode being connected to the source terminal and the drain terminal of the sixth power transistor by the positive terminal and negative terminal thereof.

\* \* \* \* \*